United States Patent [19]
Cheung et al.

[11] Patent Number: 5,774,298
[45] Date of Patent: Jun. 30, 1998

[54] ASYNCHRONOUS DIGITAL PES DEMODULATION DISK DRIVE SERVO CONTROL SYSTEM

[75] Inventors: Wayne Leung Cheung; Chung Chuan Liu; Francis Edward Mueller, all of San Jose, Calif.

[73] Assignee: International Business Machines Corporation, Armonk, N.Y.

[21] Appl. No.: 599,534

[22] Filed: Feb. 6, 1996

Related U.S. Application Data

[63] Continuation of Ser. No. 156,531, Nov. 23, 1993, abandoned.

[51] Int. Cl.$^6$ .................................................. G11B 5/596
[52] U.S. Cl. ...................................... 360/77.08; 360/78.14
[58] Field of Search ........................... 360/77.08, 77.07, 360/77.11, 77.05, 78.14

[56] References Cited

U.S. PATENT DOCUMENTS

| | | | |
|---|---|---|---|
| 4,669,004 | 5/1987 | Moon et al. | 360/53 |
| 4,740,736 | 4/1988 | Sidman et al. | 318/608 |
| 4,896,240 | 1/1990 | Moriya et al. | 360/77.07 X |
| 5,050,016 | 9/1991 | Squires | 360/77.08 |
| 5,089,757 | 2/1992 | Wilson | 318/560 |
| 5,170,299 | 12/1992 | Moon | 360/78.14 X |
| 5,345,342 | 9/1994 | Abbott et al. | 360/77.08 X |

FOREIGN PATENT DOCUMENTS 0 456 348  11/1991  European Pat. Off. .

OTHER PUBLICATIONS

D. Freitas, G. Herbst and M. Moser, "Asynchronous Quadrature Burst Position Error Demodulation Technique," IBM Technical Disclosure Bulletin, vol. 34, No. 5, Oct. 1991, pp. 406–407.

C. C. Liu, "Quad–Burst Servo Pattern," IBM Technical Disclosure Bulletin, vol. 22, No. 12, May 1980, pp. 5436–5438.

W. A. Herrington and F. E. Mueller, "Quad–Burst PES System for Disk File Servo," IBM Technical Disclosure Bulletin, vol. 21, No. 2, Jul. 1978, pp. 804–805.

*Primary Examiner*—Aristotelis Psitos
*Assistant Examiner*—James T. Wilson
*Attorney, Agent, or Firm*—Baker, Maxham, Jester & Meador

[57] ABSTRACT

A digital servo control system for a disk drive provides asynchronous servo information signal demodulation. The system includes a digital demodulator having a digital squarer that removes any phase component of the digitized servo information signal and includes a burst signal accumulator that accumulates the squared terms according to respective burst timing intervals to produce a digital, quadrature position error signal (PES). The demodulator also can include a filter comprising a harmonic notch filter preferably implemented as a Hilbert Transform filter. Alternatively, the demodulator does not include a filter and squarer and, instead, the squarer comprises a sum-and-squarer that sums the squares of odd and even digitized samples. A split burst servo pattern for the servo control system is comprised of half-width transitions that can be written in a single pass of a recording head and therefore has no phase misalignment between adjacent flux patterns.

36 Claims, 10 Drawing Sheets

ASYNCHRONOUS DIGITAL PES DEMODULATION DISK DRIVE SERVO CONTROL SYSTEM

This application is a continuation of application U.S. patent application Ser. No. 081156,531, filed Nov. 23, 1993, now abandoned.

CROSS REFERENCE TO RELATED APPLICATION

This application is related to U.S. patent application entitled "Asynchronous Track Code Encodement and Detection for Disk Drive Servo Control System" filed by Wayne Cheung, Chenhuei Chiang, and Thinh Nguyen, assigned to International Business Machines Corporation (IBM Corporation) and given application Ser. No. 08/148,791.

BACKGROUND OF THE INVENTION

1. Field of the Invention

This invention relates generally to servo control systems and, more particularly, to disk drive servo control systems for control of disk arm assembly movement across the surface of a rotating disk.

2. Description of the Related Art

In conventional computer data storage systems having a rotating storage medium, such as a rotating magnetic or magneto-optical disk, data is stored in a series of concentric or spiral tracks across the surface of the disk. The data comprises a series of variations in disk surface magnetic orientation in the tracks. The variations in magnetic orientation, generally comprising reversals of magnetic flux, represent binary digits of ones and zeroes that in turn represent data. The binary digits must be read from the disk surface by a magnetic read/write head suspended over the disk surface that can detect the variations in magnetic orientation as the disk rotates relative to the read/write head at thousands of revolutions per minute.

Reading data from a desired one of the tracks on the disk surface requires knowledge of the read/write head position relative to the track as the disk rotates and the head is moved across the disk and requires precise centering of the head over the disk track. Conventionally, the read/write head is mounted on a disk arm that is moved by a servo. A disk drive servo control system controls movement of the arm across the surface of the disk to move the read/write head from track to track and, once over a selected track, to maintain the read/write head in a path over the centerline of the track. Maintaining the read/write head centered over a track permits accurate reading and recording of data in the track.

A servo control system maintains the read/write head centered over a track by reading servo information from the disk surface. The servo information comprises a servo pattern of high frequency magnetic flux transitions, generally flux reversals, that are pre-recorded in the tracks. A servo read head, which can be the same head used for reading the binary data or can be a dedicated servo pattern head, detects the servo pattern and produces an analog signal. The servo pattern analog signal is demodulated by servo control system circuitry to provide information on the track from which the servo pattern was read and on the position of the read/write head relative to the track and also to produce a position error signal that is used to control the disk arm servo. In this way, the servo control system detects the track over which the read/write head is positioned and controls movement of the head relative to the track.

There are a variety of methods for providing servo information to a disk servo control system. In a method referred to as the dedicated servo method, the entire surface of one disk is provided with servo information. A servo magnetic head is positioned over the dedicated servo disk surface in a fixed relationship relative to one or more data read/write heads positioned over data disk surfaces. The position of the servo head is used to indicate the position of the data read/write heads. The dedicated servo method is most often used with multiple disk systems, because a dedicated servo system for a single disk application would use one-half of the available disk surface area for servo information and therefore would not be especially efficient.

Another method of providing servo information is known as the sector servo method. In the sector servo method, each disk surface includes servo information and binary data. The tracks on a disk surface are divided into radial sectors having a short servo information area followed by a data area. The servo information area includes a sector marker, which indicates to the read/write head that servo information immediately follows in the track, track identification data, and a high-frequency servo burst pattern. The sector servo method is more efficient than the dedicated servo method for low profile disk drives with fewer disks in the configuration, because a single read/write head can be used to obtain the servo information and to read and record data from the disk and also because less of the disk surface area is used for servo information. As users demand greater storage capacities from low profile disk systems, manufacturers provide less and less disk area for servo information, by decreasing sector length and track width. To obtain the same amount of servo information in less disk area, the servo information must be recorded at higher and higher frequencies. The higher frequencies increase the difficulty of writing and reading the servo information.

In both the dedicated servo and sector servo methods, an analog position error signal (PES) is produced as the servo pattern is read from the disk and is used to generate a corrective input signal to the read/write head positioning servo. The remaining description assumes a sector servo system, but it will be clear to those skilled in the art how the description can be applied to dedicated servo systems. The servo pattern flux reversals are distributed about each track centerline and, when read from the disk and demodulated, provide a PES whose amplitude depends on the location and orientation of flux reversals in the track located beneath the read/write head. The PES provides an indication of the direction and extent of read/write head movement required to maintain the head centered about the track.

More particularly, the PES is produced, or demodulated, from the flux transitions by determining the amplitude difference of information read from each side of the track centerline. The resulting PES indicates the deviation of the read/write head from the track centerline. If the amplitude difference in information from both sides of the centerline is zero, then it is assumed that the read/write head is positioned exactly over the track centerline. A positive amplitude difference in the information indicates that the head is off center in one direction and a negative amplitude difference in the information indicates that the head is off center in the opposite direction.

The majority of conventional disk drive systems demodulate the PES using analog methods. As the servo pattern flux transitions on either side of a track centerline pass by the magnetic read/write head, the head produces an amplitude-varying analog signal that is sent to a preamplifier. An automatic gain control circuit typically receives the preamplified signal and produces a signal with reduced dynamic range, which makes the signal easier to process and can thereby reduce errors. Analog demodulation techniques provide a position error signal (PES) that indicates the position of the read/write head relative to the track centerline. The PES can be provided to a servo controller to control the disk arm servo and keep the read/write head centered about the track. The PES also can be provided to an analog-to-digital converter to produce a digital position error signal, which is then used to control the disk arm servo.

It also is known to demodulate the PES using digital signal processing techniques. See, for example, U.S. Pat. No. 5,089,757 to Wilson entitled Synchronous Digital Detection of Position Error Signal. Digital techniques permit the sharing of components such as preamplification, automatic gain control, and analog-to-digital conversion elements between the PES processing system and the binary data processing system, thereby simplifying overall servo control circuit construction. In addition, digital demodulation permits the use of relatively sophisticated signal processing techniques that are not easily implemented with analog demodulators. These techniques can be used, for example, to remove spurious signal artifacts resulting from other system components or from the analog-to-digital conversion process itself.

Many digital PES demodulator systems are of the synchronous type, in which sampling of the servo information from the disk and analog-to-digital conversion of the signal are synchronized with the storage device system clock. Such synchronous demodulation systems require a synchronization field in the servo information areas of the disk and use a phase-lock-loop (PLL) to control the servo information sampling and analog-to-digital conversion. Unfortunately, the synchronization field reduces the disk area available for recording of data. In addition, the PLL can introduce processing errors that can require additional compensating circuit components, complicating the design and construction of the digital PES demodulator.

The desire for increased storage capacity, resulting in what are commonly referred to as high density disk drive systems, also has resulted in new read/write head technologies. For example, magneto-resistive (MR) read/write heads are becoming more common because they permit reading of data at relatively high frequencies even with lower disk rotational velocity. The higher frequencies permit servo information and binary data to take up less disk space, increasing disk capacity. Unfortunately, the nonlinear characteristics of MR read/write heads result in strong second-order harmonics in the read signal that can introduce extra errors in the resulting PES, which can cause mistracking of the read/write head.

A conventional servo pattern typically extends across the full width of the data tracks in a staggered fashion across the disk surface and is recorded by a magnetic head that extends across only a portion of the track. Therefore, the servo pattern flux transitions typically are recorded by multiple passes of the magnetic head relative to the servo information area. With each pass, a different portion of the servo pattern is recorded until the entire pattern is completed. See, for example, the article "Quad-Burst PES System for Disk File Servo" by W. A. Herrington and F. E. Mueller, published in IBM Technical Disclosure Bulletin Vol. 21, No. 2 (Jul. 1978) at pages 804–805.

In particular, FIG. 1 shows a conventional servo pattern 10 recorded in tracks across a disk. Only four tracks 12, 14, 16, 18 are illustrated for simplicity. The servo pattern is comprised of bursts of an even number of sequential flux transitions, represented as vertical bars 20, that are recorded at a predetermined transition frequency in a group of four bursts staggered across the disk on each sector. For reasons of linearity known to those skilled in the art, the magnetic head that records the flux transitions in the tracks records a flux orientation of no more than one-half track width at a time. Each flux transition 20 extends across the entire width of a track and therefore requires multiple passes of the head. Thus, two flux transitions 20a and 20b are aligned in the disk radial direction to form a single flux transition. The multiple passes can result in misalignment of flux transitions from adjacent passes. Even small misalignments can produce phase errors when the recorded servo information is read at a later time. It would be advantageous if a simplified servo pattern could be used that would reduce the likelihood of misalignment between flux transition passes. Moreover, it also would be advantageous if a servo pattern could be more easily recorded in the reduced track widths that are becoming more commonplace.

From the discussion above, it should be apparent that there is a need for a digital PES demodulator with reduced overall circuit complexity that makes use of effective digital signal processing techniques to accommodate high frequency servo patterns and reduce head mistracking. It also should be apparent that there is a need for simplified servo patterns that can be accommodated in narrow data tracks and can be used with digital PES demodulators, and that reduce the likelihood of misalignment errors. The present invention fulfills these needs.

SUMMARY OF THE INVENTION

The present invention provides a disk drive servo control system with an asynchronous digital PES demodulator having a digital squarer that removes any phase component of the digitized servo information signal and includes a burst accumulator that accumulates the squared terms according to respective servo burst pattern timing intervals. In one aspect of the invention, the demodulator includes a digital asymmetric notch filter, which filters the digitized servo information signal before providing it to the squarer, and uses the squarer to perform a term-by-term squaring of the filtered signal. In such a configuration, the filter preferably is implemented as a harmonic notch finite impulse response (FIR) filter. In another aspect of the invention, the demodulator does not include a notch filter and instead the squarer comprises a quadrature sum-and-squarer that squares the sums of odd and even digitized samples. In this way, a disk drive servo control system in accordance with the present invention eliminates phase induced error in the demodulated PES, benefits from sharing signal processing components with the binary data processing components, does not require a phase lock loop or clock synchronization field in the servo information, and can remove spurious artifacts from the demodulated servo information signal.

In another aspect of the invention, a servo pattern for use with PES demodulators comprises a split burst pattern that does not extend across the full width of a track and therefore does not include any flux transitions that must be radially aligned with other transitions and recorded in adjacent passes of a write head. That is, the split burst pattern is recorded such that every flux transition comprising the pattern is formed by a single pass of a magnetic head. This eliminates phase error in the servo information read from the disk that otherwise likely would result from misaligned burst patterns. The split burst servo pattern is especially suited for use with the demodulator of the present invention, but also can be used with conventional demodulation techniques for improved performance. A demodulator in accordance with the invention combines radially succeeding burst pattern groups to produce the PES.

Other features and advantages of the present invention should be apparent from the following description of the preferred embodiments, which illustrate, by way of example, the principles of the invention.

DESCRIPTION OF THE PREFERRED EMBODIMENTS

Figure 2:
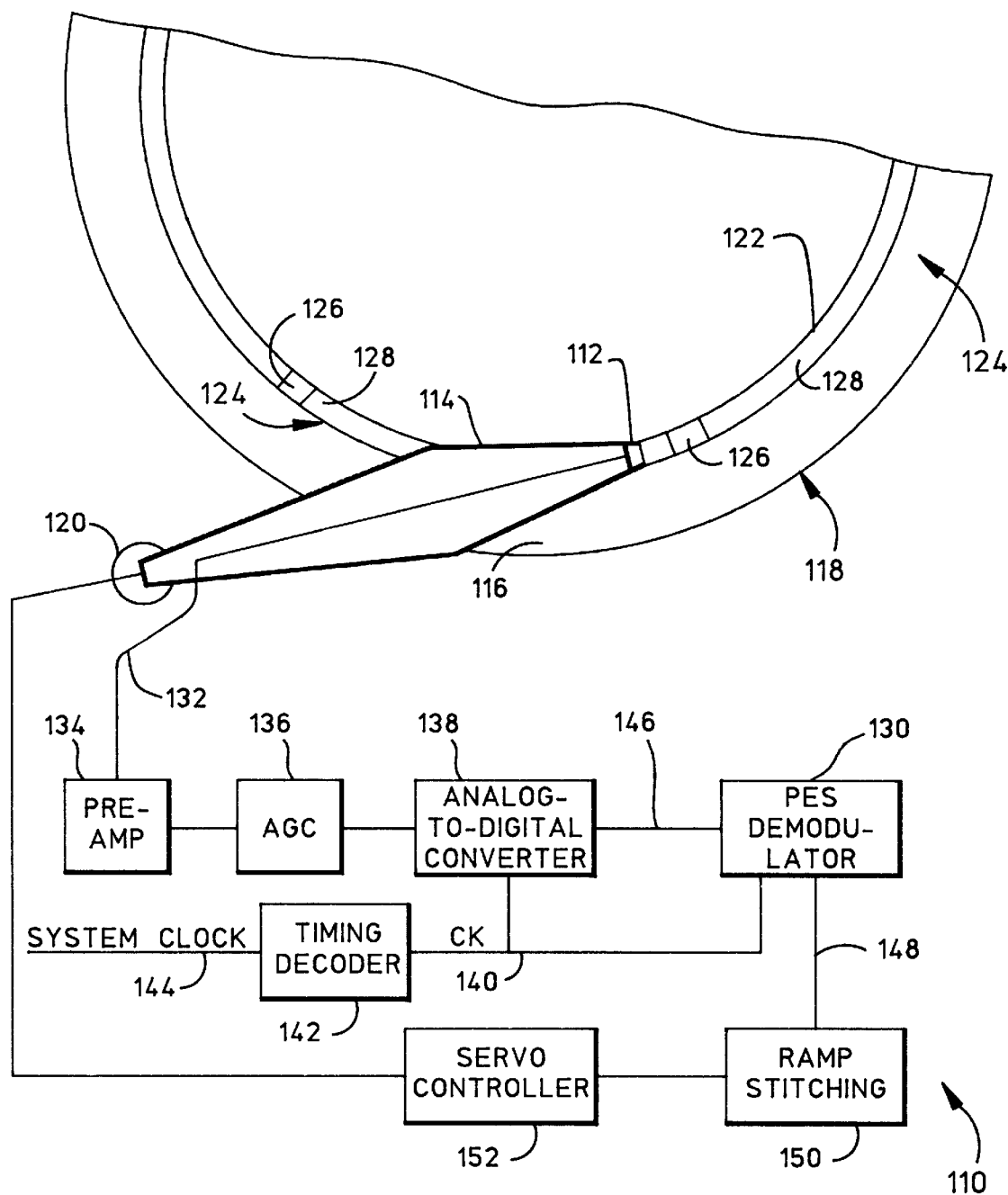
FIG. 2 is a schematic block diagram of a disk drive servo control system constructed in accordance th the invention.

Referring to FIG. 2, there is illustrated a disk drive servo control system 110 constructed in accordance with the present invention. The disk drive includes a magnetic read/write head 112 mounted on a disk arm 114 that is moved across the surface 116 of a storage medium comprising a magnetic disk 118 by a servo assembly 120. The read/write head reads changes in disk magnetic flux orientation recorded in tracks across the disk. In FIG. 2, only one track 122 is shown for clarity. FIG. 2 diagrammatically shows that the track is divided into sectors 124 having a servo information field 126 followed by a data field 128. The servo control system controls movement of the disk arm 114 across the disk to move the read/write head 112 from track to track and to maintain the read/write head centered over a desired track. As the read/write head moves across the disk surface 116, the read/write head reads servo information recorded on the disk surface at the time of disk manufacture and provides it to a demodulator 130 that asynchronously demodulates the servo information and squares the resulting signal to produce a position error signal (PES) that is used to control movement of the disk arm. In this way, the servo control system 110 eliminates phase induced error in the demodulated PES, benefits from sharing signal processing components with disk drive components for reading data from the data fields 128, does not require a phase lock loop and a clock synchronization field in the servo information, and can effectively remove spurious artifacts from the demodulated servo information signal using digital techniques.

When the read/write head 112 reads servo information from the track 122, the head produces a servo information signal that is provided over a head output line 132 to a preamplifier 134. The preamplifier amplifies the servo information signal and provides the amplified signal to an automatic gain control (AGC) 136 that adjusts the gain applied to the signal to maintain the signal amplitude within a range that is predetermined to simplify information processing, reduce noise, and improve system linearity. The amplified signal from the AGC 136 is provided to an analog-to-digital converter 138 that asynchronously converts the signal in accordance with a sampling clock signal CK received over a sampling clock line 140. The sampling clock signal CK is produced by a timing decoder 142 that receives a system clock signal over a system clock signal line 144. If m is the number of samples to be sampled for each analog servo signal cycle, then the sampling clock signal CK should be m times the servo signal frequency. Thus, the frequency of the servo information signal recorded on a disk must be known for construction of the control system 110. The digitized servo information signal is provided over a converter output line 146 to the demodulator 130, which produces a position error signal (PES) that indicates the direction and extent of servo movement required to maintain the read/write head 112 centered about a track 122. Finally, the PES is provided over a demodulator output line 148 to a conventional ramp stitching block 150 and then to a servo controller 152 that generates control signals provided to the servo 120 to move the disk arm 114 and read/write head 112.

Preferably, the automatic gain control (AGC) 136 and analog-to-digital converter 138 of the control system 110 are shared with the digital detection channel. That is, the AGC and converter are used both for detecting the servo information from the servo information field 126 of the track and the digital data from the data field 128 of the track. This reduces the number of components necessary for reading data from the disk and simplifies the overall construction of a disk drive servo control system.

Figure 3:
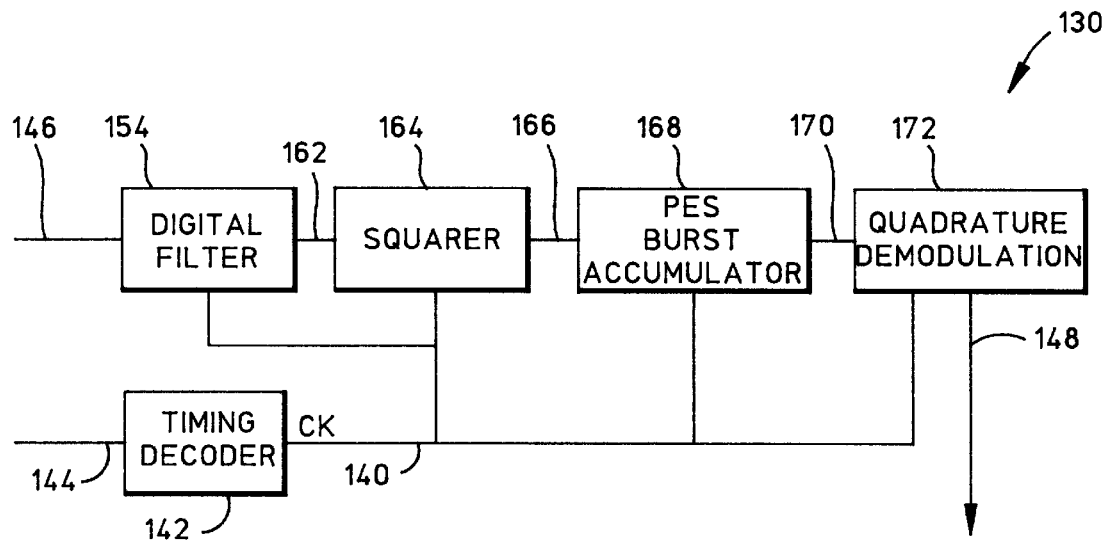
FIG. 3 is a schematic block diagram of the PES demodulator illustrated in FIG. 2.

FIG. 3 is a block diagram of a first preferred embodiment of the PES demodulator 130 constructed in accordance with the present invention. In the demodulator, a digital filter 154 receives the digitized servo information signal over the converter output line 146. Preferably, the filter is implemented as a finite impulse response (FIR) filter circuit providing a harmonic notch equalizer filter with odd symmetry coefficients, known to those skilled in the art as a Hilbert Transform filter. Such a filter eliminates signal asymmetry, shouldering, and baseline distortion, and other unwanted noise. The output of such a filter more closely resembles digital output to be expected from a sinusoidal input signal.

For purposes of discussion, an input signal to the filter 154 can be represented as a series of m digital values $x_0, x_1, \ldots, x_{m-1}$ obtained per sampling interval of the analog-to-digital converter 138 via filter taps. The Hilbert Transform filter has coefficients denoted by the set $(H_o\ H_1 \ldots H_{m-1})$ for m samples per sampling interval. A set of Hilbert Transform coefficients for the FIR can be trained to perform the Hilbert Transform filtering for random phase sampling applications such as the asynchronous digital sampling controller of the present invention, in which the sampled input signal is phase non-coherent with the sampling clock signal. In the field of disk drive servo information signals, the present inventors have found that good results have been obtained for a digital sampling interval of four samples (m=4) per servo information cycle by processing the input data values $x_n$, n=0, 1, 2, 3, . . ., for a sample interval to produce filtered data $y_n$ for each sample value $x_n$ defined by a sum of products:

$$Y_n = \Sigma(H_i)(x_{n-i}) \text{ summed over i,}$$

where i=0, 1, 2 and the filter coefficients are defined by:

$H_i = (-0.5\ 0\ 0.5)$ or $(-1.0\ 0\ 1.0)$.

Alternatively, for an analog-to-digital converter performing eight samples per servo information signal cycle (m=8), the preferred embodiment includes a digital filter having coefficients defined by:

$H_i = (-0.25\ -0.35\ -0.25\ 0\ 0.25\ 0.35\ 0.25)$ to produce a series of values yn comprising a sum of products summed over i, where i=0, 1, . . ., 6. The Hilbert Transform coefficients for eight samples per servo information signal cycle generally can be defined by:

$H_i = k\ (-1.0\ -1.41\ -1.0\ 0\ 1.0\ 1.41\ 1.0)$, where k is a scaling constant.

Figure 4:
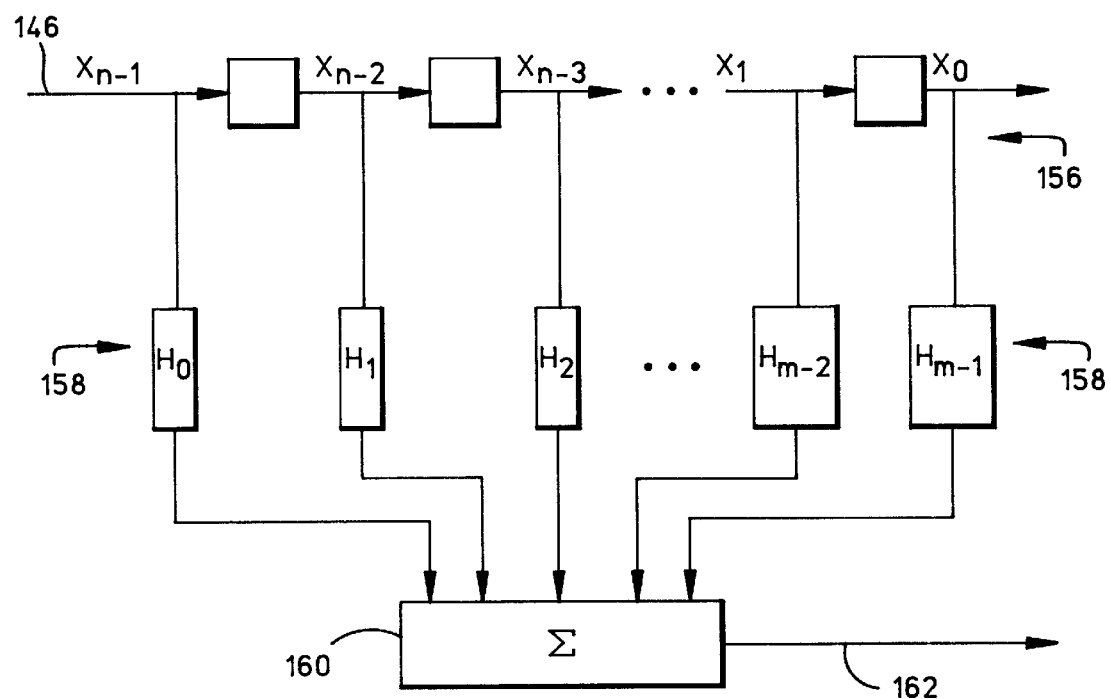
FIG. 4 is a block diagram of the filter illustrated in FIG. 3.

FIG. 4 is a block diagram of the filter 154 showing the servo information signal values received over the converter output line 146 and provided to the filter by filter taps 156, their multiplication by filter coefficient blocks 158, and their summation by a filter summer 160 to produce a filter output signal provided over a filter output line 162. The filter response rejects the DC content and other odd and even harmonic contents of the signal samples and eliminates PES demodulation errors caused by random phase sampling processing. Furthermore, the filter response can be optimized to eliminate unwanted noise to improve the signal dynamic range.

Referring back to FIG. 3, the output of the digital filter 154, comprising a series of m samples per servo information signal cycle, is provided over the filter output line 162 to a squarer 164. The squarer receives the series of filtered values yn from the digital filter and squares each value. Thus, the squarer function is defined by:

$$z_n = (y_n)(y_n), n=0, 1, 2, \ldots,$$

where z represents the output of the squarer. For the preferred embodiment taking eight samples per servo information signal cycle, eight z-values likewise will be produced by the squarer 164 for each servo information signal cycle. The squarer can be implemented either as a logic circuit or as a look-up table and provides an alternating quadrature data string. The output of the squarer is provided over a signal line 166 to a PES burst accumulator 168 that preferably is implemented as a running sum logic circuit. In accordance with the four-interval servo burst pattern having burst intervals P1, P2, P3, and P4, as described in greater detail below, the PES burst accumulator adds all squared sample values $z_n$ and converts the sums to produce PES signals PESA, PESB, PESC, and PESD. The PES signals are defined by the following relationships:

PESA=$\Sigma z_n$ for burst intervals P1 and P2,
PESB=$\Sigma z_n$ for burst intervals P3 and P4,
PESC=$\Sigma z_n$ for burst intervals P2 and P3,
PESD=$\Sigma z_n$ for burst intervals P1 and P4.

The output signals of the accumulator 168 are provided over an output line 170 to a quadrature demodulation block 172 that subtracts the PES signals as follows to define primary and quadrature PES signals PESP and PESQ:

PESP=PESD−PESC
PESQ=PESB−PESA, wherein the P and Q signals are ninety-degrees out of phase as the head is moved across the tracks. The quadrature demodulation block 172 can be implemented in the demodulator 130 (FIG. 2) either as a logic circuit within the demodulator or as microprocessor firmware. The digital filter 154, squarer 164, burst accumulator 168, and quadrature demodulation block 172 all operate in conjunction with the sample clock signal CK received over a timing line 140 from the timing decoder 142. As illustrated in FIG. 2, the output of the quadrature demodulation block is provided over the output line 148 of the demodulator 130 to the conventional ramp stitching block 150.

As known to those skilled in the art, the ramp stitching block 150 discards the PESP and PESQ values beyond where the absolute value of PESP equals the absolute value of PESQ and "stitches" the useful sections of the PESP and PESQ values to form a linear PES ramp for each disk track. If desired, the PES ramp signal can be further linearized with a firmware-implemented square-root approximation or an appropriate look-up table. The ramp stitching block can be implemented in the controller 110 either as a logic circuit or as microprocessor firmware.

Finally, the PES output signal from the ramp stitching block 150 is provided to the servo controller 152 to control the servo 120 and thereby control movement of the read/write head 112 across the disk 118. The servo controller typically is implemented in microprocessor firmware of the disk controller 110. As known to those skilled in the art, the servo controller uses PES ramp signal and servo Grey-code servo information data to compute track-following and track-seeking servo control signals that are provided to a digital-to-analog converter (not illustrated) to control voice-coil motors (VCM) for head positioning.

In this way, the controller 110 substantially eliminates servo information signal conversion errors due to asynchronous sampling phase error, signal distortion produced by magneto-resistive (MR) or inductive heads, and phase jitter caused by high bandwidth components. The controller constructed in accordance with the invention is especially suited for high-density disk drive systems that must demodulate a PES from servo information fields of increased frequencies and reduced widths.

Figure 5:
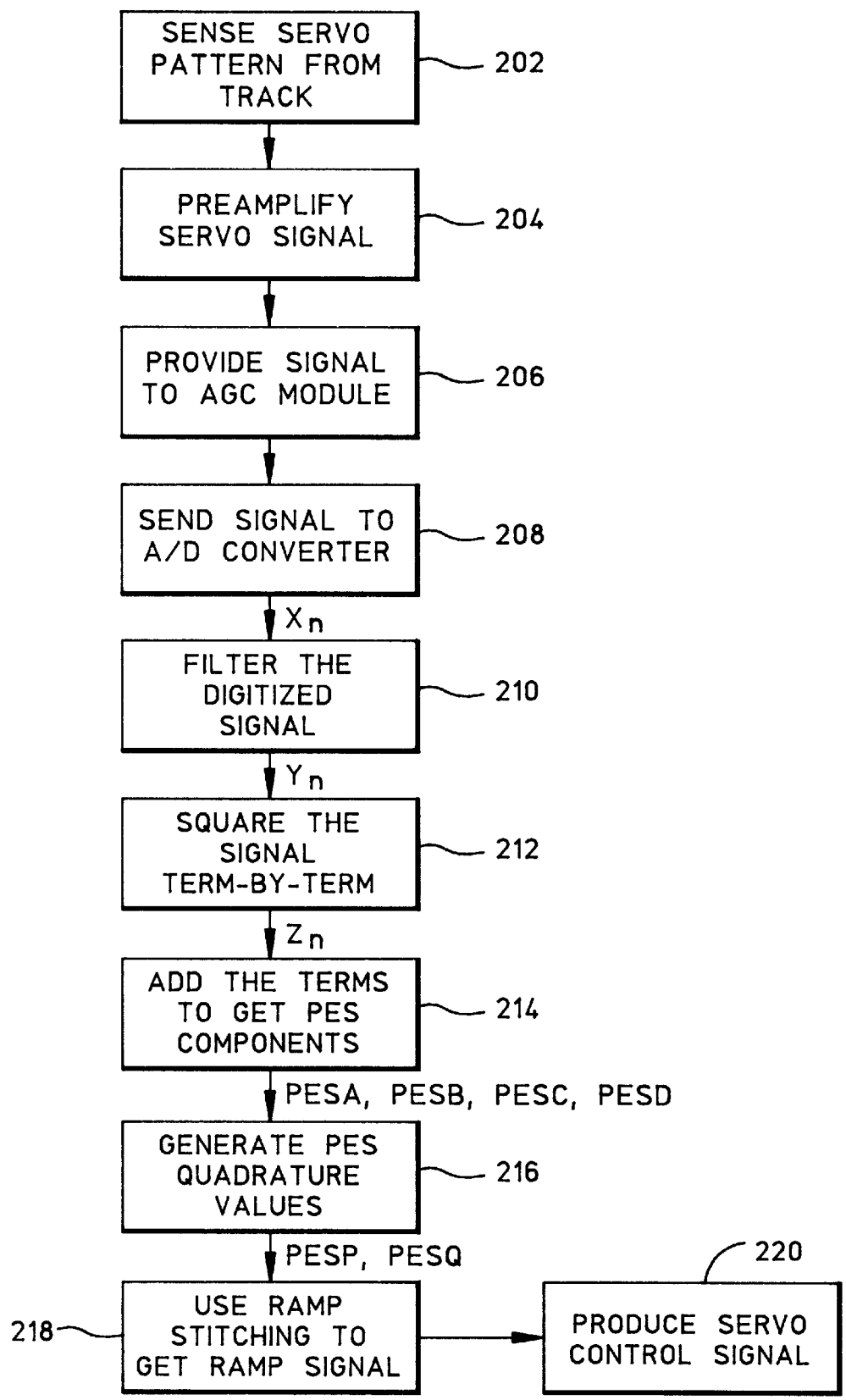
FIG. 5 is a flow diagram of the processing steps carried out by the control system illustrated in FIG. 2.

The operation of the disk drive controller 110 illustrated in FIGS. 2, 3, and 4 is represented by the steps of the flow diagram illustrated in FIG. 5. The flow diagram steps can be implemented as hardware circuits and microprocessor firmware in the controller. The initial step illustrated by the first flow diagram box 202 is to sense the servo pattern transitions from the track of a disk. Next, the controller pre-amplifies the analog servo information signal sensed from the disk at the flow diagram box numbered 204. At the flow diagram box numbered 206, the controller provides the analog signal to the automatic gain control block and then, at the box numbered 208, the signal is provided to the analog-todigital converter. The digitized values $x_n$ are next provided to the digital filter with Hilbert Transform coefficients to produce the filtered digital signal values $y_n$ at the box numbered 210. From the digital filter, the values $y_n$ are provided to the squarer at the flow diagram box numbered 212 to produce the squared values $z_n$. At the flow diagram box numbered 214, the squared values $z_n$ are provided to the burst accumulator to remove phase error. The $z_n$ values are added together, cycle by cycle. Thus, if four samples are taken per servo information signal cycle, and there are four cycles per burst, then sixteen terms per burst interval will be added together to produce the PESA, PESB, PESC, and PESD terms. Because the terms PESA, PESB, PESC, and PESD are each produced using two burst intervals, if sixteen terms per burst interval are added, then each of the terms PESA, PESB, PESC, and PESD will be defined by thirty-two terms. At the flow diagram box numbered 216, the PESA, PESB, PESC, and PESD terms are provided to the quadrature demodulation block to generate quadrature PES values PESP and PESQ according to the original burst pattern recorded on disk. Finally, at the flow diagram box numbered 218, the quadrature PESP and PESQ values are provided to the ramp stitching block to produce the PES ramp signal and then the output of the ramp stitching block is provided to the servo controller at the flow diagram box numbered 220 to move the disk arm and read/write head as indicated by the PES.

Figure 6:
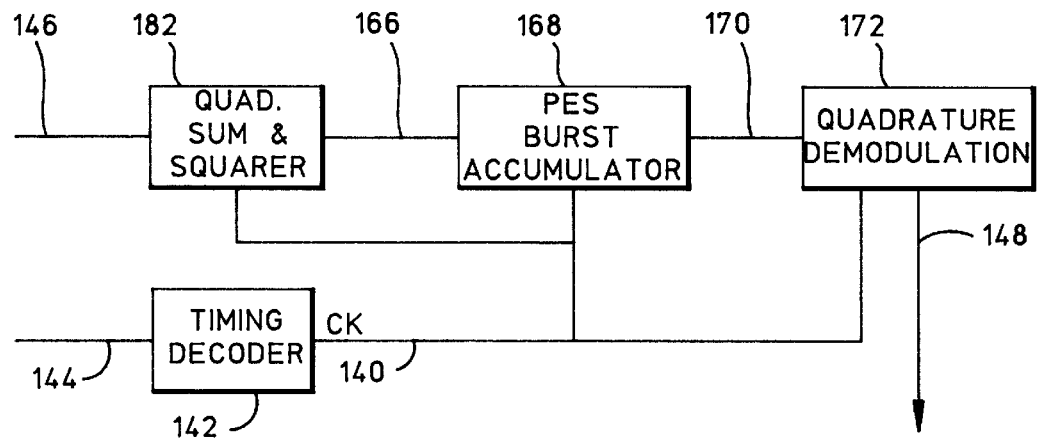
FIG. 6 is a schematic block diagram of a second PES demodulator constructed in accordance with the invention for use with the disk drive servo control system illustrated in FIG. 2.

FIG. 6 shows a block diagram of a second preferred embodiment of the PES demodulator 130 constructed in accordance with the present invention. In the FIG. 6 embodiment, a squarer is provided as a quadrature sum and squarer 182 and receives the output of the analog-to-digital converter 138 (FIG. 2) over the converter output line 146 for m samples per servo information signal cycle. The sampling frequency of four samples per servo pattern cycle is selected such that the consecutive sample points are 90° apart in terms of the servo signal phase. Thus, the samples can be said to constitute alternating odd and even terms. The sum and squarer 182 adds the sample magnitudes for like samples, squares them, and sums the terms for a burst interval. That is, rather than the simple squaring of the sample values described in connection with the squarer of the first embodiment illustrated in FIG. 4, the FIG. 6 embodiment includes a sum and squarer that produces output terms $Z_n$ defined by:

$$Z_n = \Sigma(x_n)_o(x_n)_o + (x_n)_e(x_n)_e, \ n=0, 1, 2, \ldots,$$

where $(x_n)_o$ are the sum of odd sample magnitudes and $(x_n)_e$ are the sum of even sample magnitudes for each servo information signal burst interval. As before, a PES burst accumulator 168 receives the squared terms over a signal line 166 and then provides the accumulated signal terms over a signal line 170 to a quadrature demodulation block 172 and then over the demodulator output line 148 to the ramp stitching block 150. The sum and squarer 182, like the accumulator and demodulation block, operates in conjunction with the sample clock signal CK received over the timing line 140 from the timing decoder 142.

Figure 7:
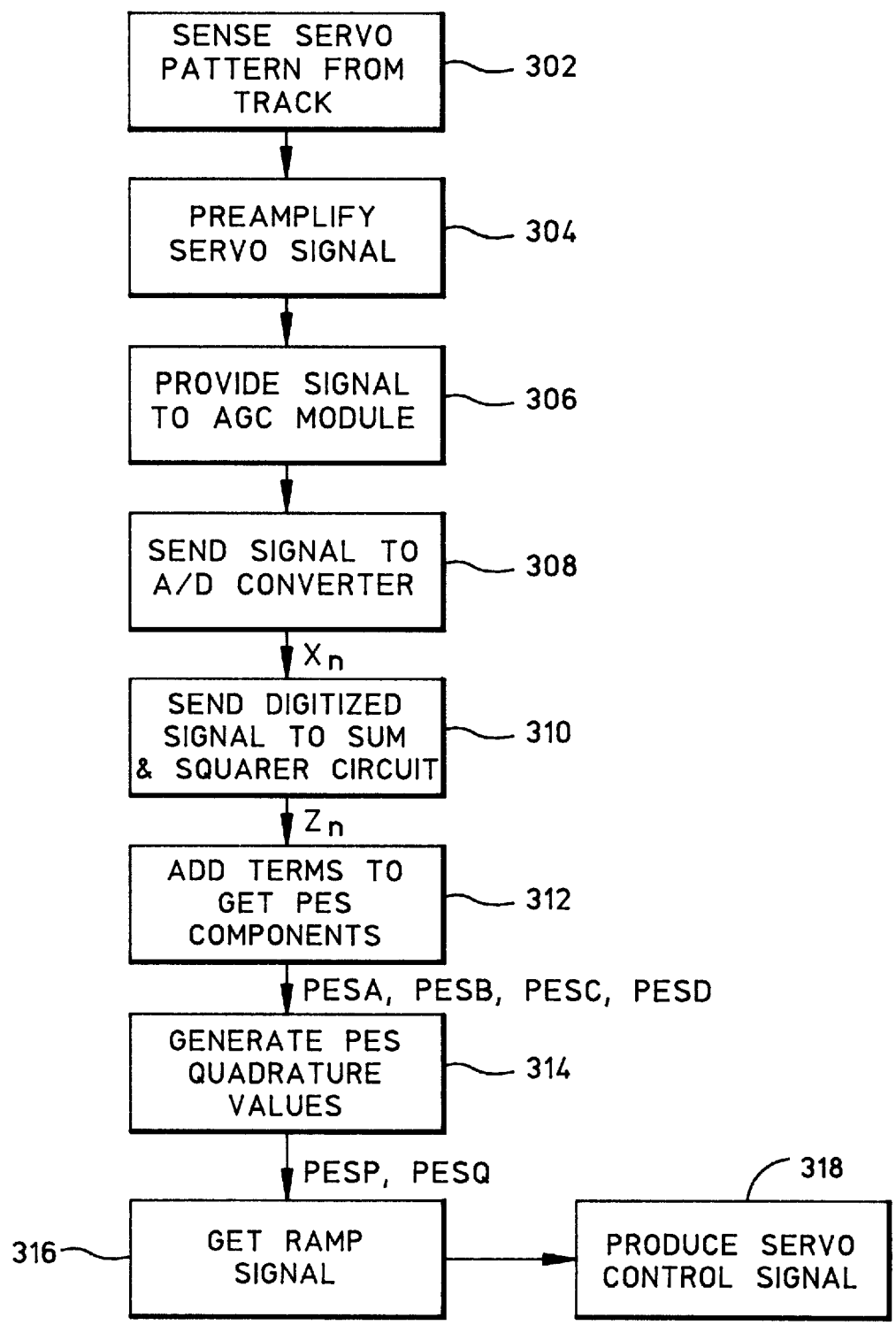
FIG. 7 is a flow diagram of the processing steps carried out by the control system illustrated in FIG. 6.

The operation of the disk drive controller 110 illustrated in FIG. 6 is represented by the steps of the flow diagram illustrated in FIG. 7. The flow diagram steps can be implemented as hardware circuits and microprocessor firmware in the controller. The initial step illustrated by the first flow diagram box 302 is to sense the servo pattern transitions from the track of a disk. Next, the controller pre-amplifies the analog servo information signal sensed from the disk at the flow diagram box numbered 304. At the flow diagram box numbered 306, the controller provides the analog signal to the automatic gain control block and then, at the box numbered 308, the signal is provided to the analog-to-digital converter. The digitized values $x_n$ are next provided to the sum and squarer of the demodulator to produce the output signal values $Z_n$ at the box numbered 310. At the flow diagram box numbered 312, the summed and squared values $z_n$ are provided to the burst accumulator to produce the PESA, PESB, PESC, and PESD terms. At the flow diagram box numbered 314, the PESA, PESB, PESC, and PESD terms are provided to the quadrature demodulation block to generate the quadrature PES values PESP and PESQ. Finally, at the flow diagram box numbered 316, the quadrature PESP and PESQ values are provided to the ramp stitching block to produce the PES ramp signal and then the output of the ramp stitching block is provided to the servo controller at the flow diagram box numbered 318 to move the disk arm and read/write head as indicated by the PES.

Figure 1:
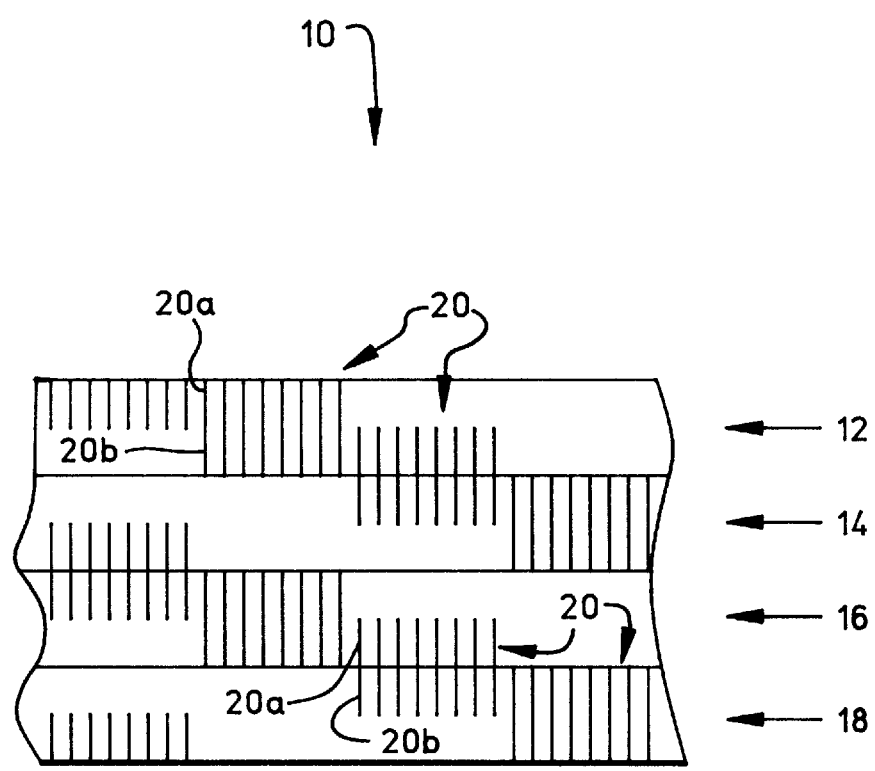
FIG. 1 is a schematic representation of the flux transitions of a conventional servo burst pattern recorded in tracks of a storage medium.
Figure 8:
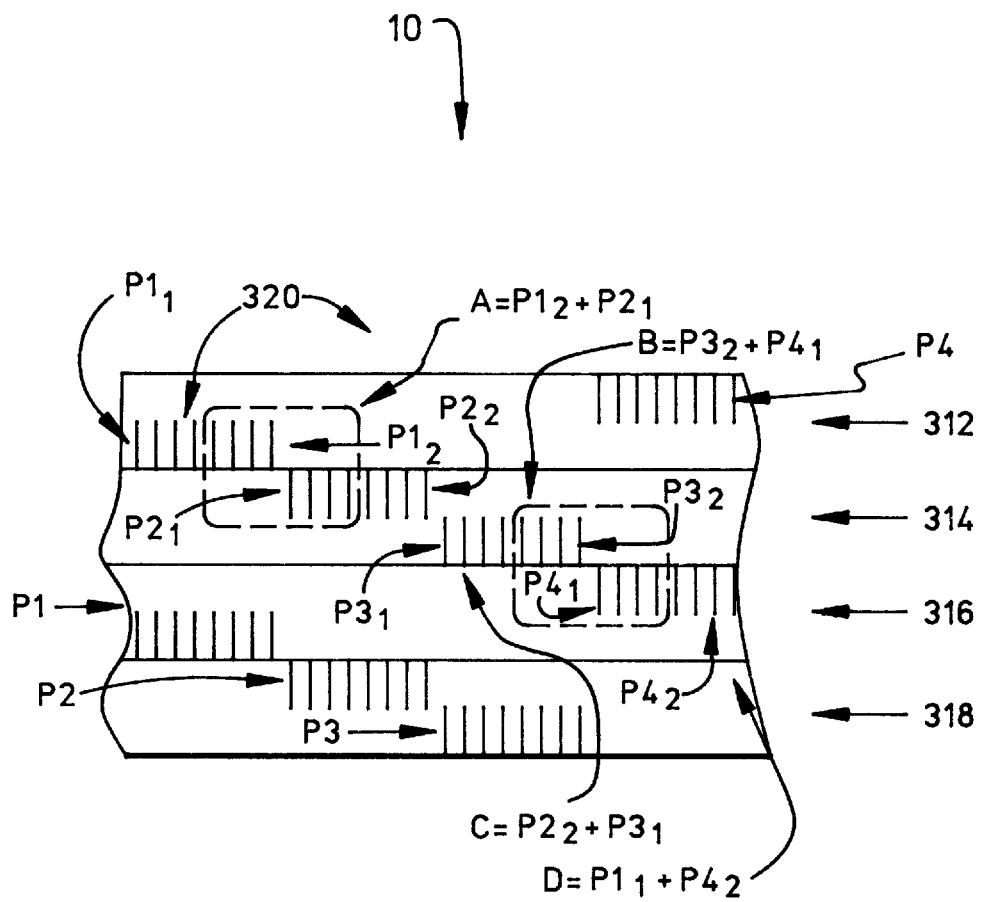
FIG. 8 is a representation of a first split burst servo pattern recorded in accordance with the invention.

As illustrated in FIG. 1, conventional servo patterns have transitions of magnetic flux orientation that extend across the full width of disk data tracks in a staggered fashion across the disk surface such that each transition is comprised of two transitions each recorded from a single pass of a recording head and aligned in the disk radial direction. As noted above, such patterns are susceptible to alignment errors that produce noise in the resulting PES. To reduce the amount of noise that results from reading such a pattern, a servo pattern in accordance with the present invention preferably comprises a "split burst" pattern having transitions that do not extend across the full width of a track. In this way, transitions from adjacent passes of a recording head do not need to be aligned to produce the pattern. Rather, the split burst pattern is recorded such that every flux transition is formed by a single pass of a magnetic head. FIG. 8 is a representation of a first split burst servo pattern constructed in accordance with the present invention, recorded on a disk.

FIG. 8 shows a disk 10 and four tracks 312, 314, 316, and 318 across the disk surface. The illustrated servo burst pattern comprises eight half-width transitions 320 per burst. The transitions define a pattern having four repeating groups P1, P2, P3, and P4 per sector, each of which can be recorded in a single pass of a recording head. Because the transitions are only one-half track wide, it is not necessary to align adjacent transitions so that they appear to be recorded by a head that extends across the full track, as is necessary with the conventional FIG. 1 servo pattern. Therefore, there is no alignment problem with the pattern illustrated in FIG. 8. As known to those skilled in the art, for accurate servo information reading, the servo pattern must provide linearity across the full track width. Therefore, the transitions 320 of the FIG. 8 split burst servo information pattern are individually measured and combined arithmetically to determine the equivalent amplitudes of the bursts across the track.

More particularly, for use with the servo controller 110 described above, radially succeeding groups of transitions must be combined to produce PES component signals and, ultimately, the PES. One combining scheme can be defined whereby an A-burst group of transitions comprises a group of four transitions $P1_2$ comprising the last four transitions of the P1 group extending across a second half of a track 312 and a group of four transitions $P2_2$ comprising the first four transitions of the P2 group extending across the first half of the next track. It should be clear that, when the disk 10 rotates, the $P1_2$ group of transitions is followed in the disk radial direction by the $P2_2$ group of transitions. The sum of $P1_2$ and $P2_2$ provide the A-burst PES component signal and together provide linearity across the full width of one track, even though neither the P1 nor P2 transitions extend completely across one track. Next, a B-burst group of transitions comprises a group of four transitions $P3_2$ comprising the last four transitions of the P3 group extending across a second half of a track 314 and a group of four transitions $P4_1$ comprising the first four transitions of the P4 group extending across the first half of the next track. The B-burst signal is provided by the sum of the $P3_2$ and $P4_1$ groups. Similarly, a C-burst signal is defined by the sum of $P2_2$ comprising the last four transitions of the P2 group and of $P3_1$ comprising the first four transitions of the P3 group. Finally, a D-burst signal is defined by the sum of $P4_2$ comprising the last four transitions of the P4 group and of $P1_1$ comprising the first four transitions of a P1 group from the same track 316. In general, the A-burst, B-burst, C-burst, and D-burst signals define PES component signals defined by:

$$PESA = \Sigma\ (P1_i + P2_i)$$

$$PESB = \Sigma\ (P3_i + P4_i)$$

$$PESC = \Sigma\ (P2_i + P3_i)$$

$$PESD = \Sigma\ (P4_i + P1_i)$$

where the $P1_i$, $P2_i$, $P3_i$, and $P4_i$ are preprocessed burst samples (that is, digitized samples of the P1, P2, P3, and P4 transitions that have been squared) as defined above. The primary and quadrature components of the PES then can be generated by the PES demodulation block as follows:

PESP=PESD−PESC

PESQ=PESB−PESA and supplied to the ramp stitching block and the servo controller, as described above.

Figure 9:
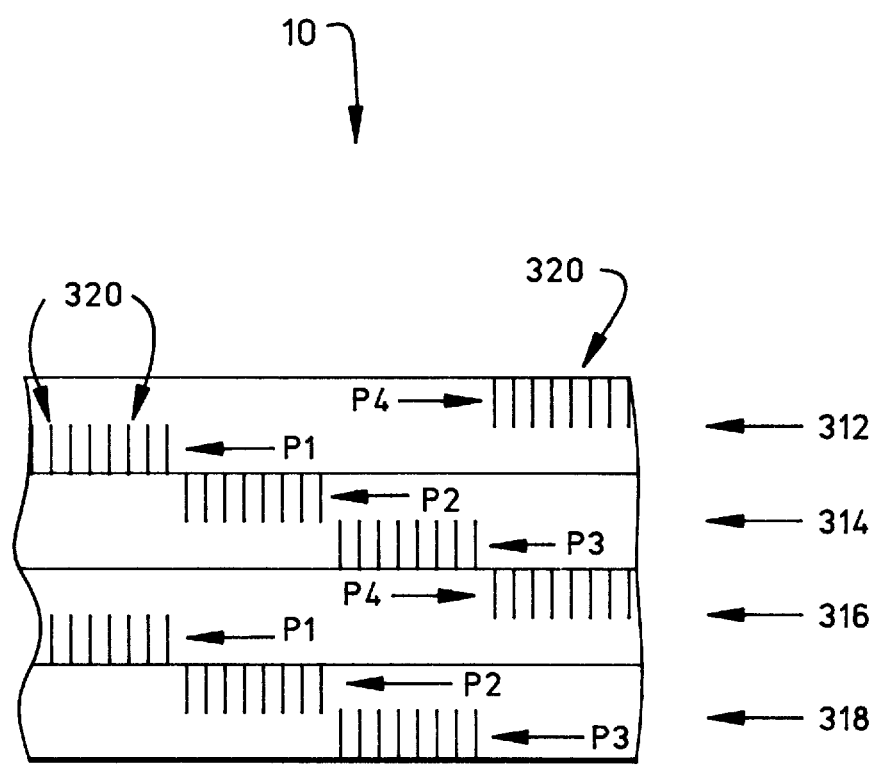
FIG. 9 is a representation of the split burst servo pattern of FIG. 8 illustrating an alternate combining scheme.

The transitions 320 of the split burst servo information pattern can be combined arithmetically in other schemes to determine the equivalent amplitudes of the bursts across the track. For example, FIG. 9 illustrates a second scheme of combining the groups of the split burst servo pattern to provide linearity and a quadrature PES. FIG. 9 shows a disk 10 and four tracks 312, 314, 316, and 318 across the disk surface. As before, the illustrated pattern comprises eight half-width transitions 320 per burst comprising four groups P1, P2, P3, and P4 per cycle. Again, because the transitions are only one-half track wide, it is not necessary to align adjacent transitions so that they appear to be recorded by a head that extends across the full track and the alignment noise problem is eliminated.

In the FIG. 9 embodiment, a first group of eight half-width transitions in the first track 312 comprising a P1 group and a second group of eight transitions in the third track 316 comprising another P1 group define a P1-burst PES component signal. A group of eight half-width transitions in the second track 314 comprising a P2 group immediately following the first P1 group and a second group of eight half-width transitions in the fourth track 318 comprising a second P2 group immediately following the second P1 group define a P2-burst PES component signal. Similarly, a P3 group of eight half-width transitions from the second and fourth tracks 314, 318 define a P3-burst PES component signal and a P4 group of eight half-width transitions from the first and third tracks define a P4-burst PES component signal, as illustrated in FIG. 9. Again, the component signals can be defined by:

$$PESA = \Sigma\ (P1_i + P2_i)$$

$$PESB = \Sigma\ (P3_i + P4_i)$$

$$PESC = \Sigma\ (P2_i + P3_i)$$

$$PESD = \Sigma\ (P4_i + P1_i)$$

where the $P1_i$, $P2_i$, $P3_i$, and $P4_i$ are digitized samples of the P1, P2, P3, and P4 transitions that have been read from the respective tracks, as defined above, and then squared. Also as before, the primary and quadrature components of the PES then can be generated by the PES demodulation block as follows:

PESP=PESD−PESC

PESQ=PESB−PESA and supplied to the ramp stitching block and the servo controller, as described above.

The split burst servo pattern and combining schemes illustrated in FIGS. 8 and 9 can be used with conventional PES demodulators that combine the PES component signals as described above, as well as with the digital disk drive controller of the present invention. In any application, the split burst servo pattern eliminates the PES errors associated with alignment problems experienced with conventional servo burst patterns.

Figure 10:
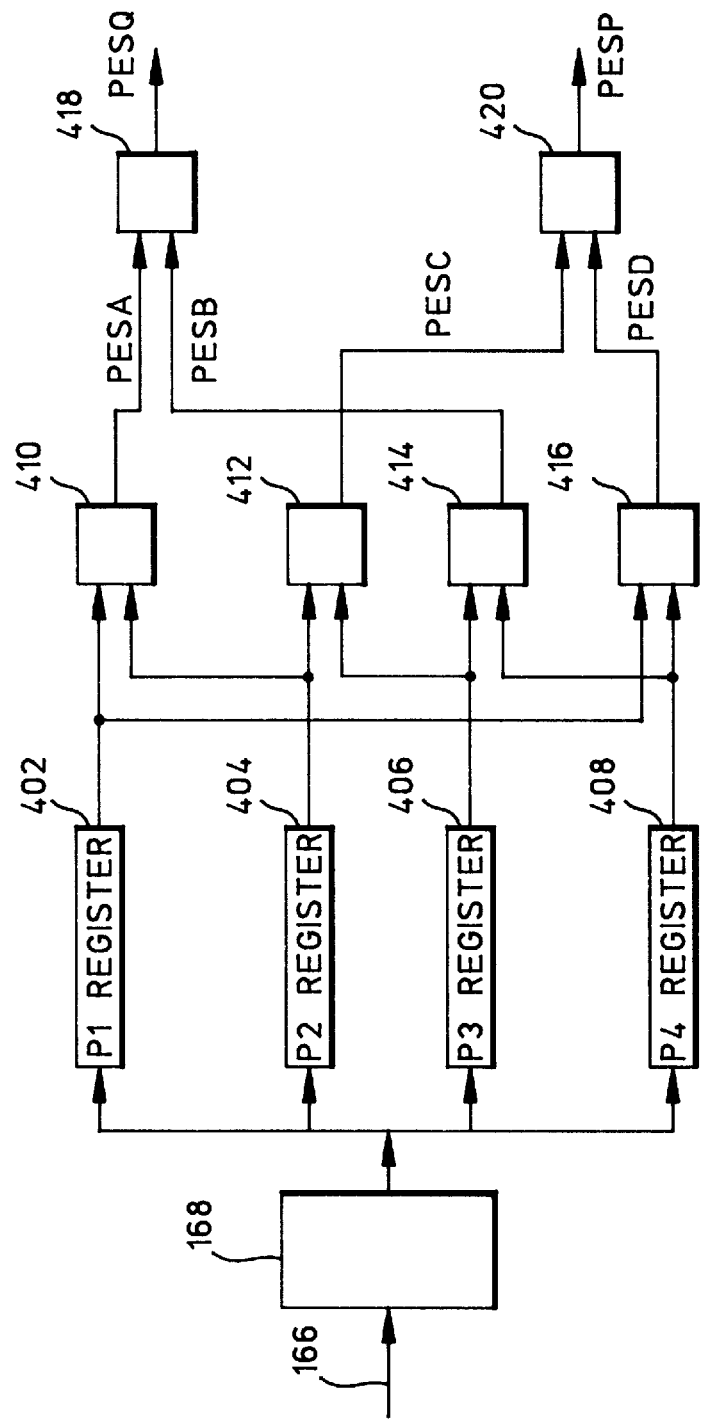
FIG. 10 is a block diagram of the PES burst accumulator illustrating the demodulation of the split burst pattern of FIGS. 8 and 9.

FIG. 10 shows a block diagram of the PES burst accumulator 168 and quadrature demodulation block 172 of the disk controller 110 for use with demodulation of the servo patterns illustrated above. The burst accumulator receives the preprocessed signals and provides them to one of four registers 402, 404, 406, and 408 corresponding to the P1, P2, P3, and P4 component signals, respectively. A group of four adders 410, 412, 414, and 416 provides the summing of the proper signals to provide the PESA, PESB, PESC, and PESD burst components, respectively, as defined above. Finally, two subtractors 418 and 420 receive the appropriate burst components and provide the proper subtraction to provide the signals PESP and PESQ, respectively, as defined above. Although FIG. 10 shows the signals PESP and PESQ on separate output lines, it is to be understood that in the preferred embodiment the PESP and PESQ signals are alternately provided on the PES burst accumulator output line 170.

Figure 11:
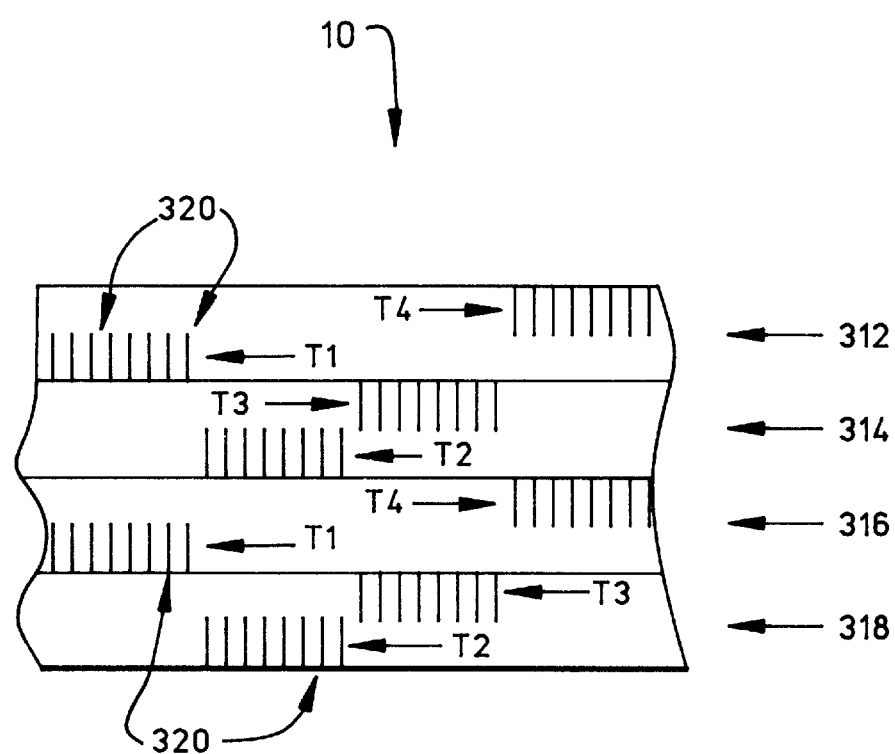
FIG. 11 is a representation of a second split burst servo pattern recorded in accordance with the invention.

Those skilled in the art will appreciate that alternative split burst patterns other than those described above can be used with the servo controller in accordance with the present invention. The repeating groups of such alternative split burst patterns can be combined to produce the PESA, PESB, PESC, and PESD component signals and then subtracted to produce the PESP and PESQ quadrature signals for generating the PES, as described above. Those skilled in the art also will appreciate that the repeating groups can be combined in a variety of ways to produce the component signals so long as radially succeeding bursts are combined, analogous to the combining of bursts described above in connection with FIGS. 8 and 9. For example, FIG. 11 shows a disk 10 and four tracks 312, 314, 316, and 318 with a split burst pattern having four repeating groups T1, T2, T3, and T4 per sector. Each of the repeating groups is comprised of eight half-width magnetic flux transitions, represented by a vertical bar 320, each of which can be recorded in a single pass of a recording head.

In the FIG. 11 burst pattern, the T1 group of the first track 312 is radially succeeded by the T3 group of the second track. That is, the when the disk 10 rotates, the T3 group of transitions next follows the T1 group in the disk radial direction. The T3 group of the first track is radially succeeded by the T2 group of the next adjacent second track 314. Similarly, the T2 group is radially succeeded by the T4 group of the next track. Finally, a T1 group of the next track 316 radially follows the T4 group of the same track. Those skilled in the art will recognize that, to properly produce the PESA, PESB, PESC, and PESD components, radially succeeding groups must be combined, so that the combining equations are as follows:

$$PESA = \Sigma(T1_i + T3_i)$$

$$PESB = \Sigma(T2_i + T4_i)$$

$$PESC = \Sigma(T2_i + T3_i)$$

$$PESD = \Sigma(T4_i + T1_i)$$

where the $T1_i$, $T2_i$, $T3_i$, and $T4_i$ are preprocessed, digitized samples of the T1, T2, T3, and T4 transitions that have been squared as described above. As before, the primary and quadrature components of the PES then can be generated by the PES demodulation block 172 (FIGS. 3 and 6) as follows:

PESP=PESD−PESC

PESQ=PESB−PESA and supplied to the ramp stitching block and servo controller. Those skilled in the art will recognize that other repeating groups and combining equations can be provided, consistent with the principles of the invention.

The present invention described above provides a disk drive servo control system that eliminates phase error in the demodulated PES, shares components with the digital data processing elements of the disk drive and achieves greater efficiency, does not require a phase lock loop and provides simpler circuit design, does not require a clock synchronization field in the servo information and thereby increases disk data capacity, and makes effective use of digital signal processing techniques for accurate PES demodulation. In addition, the split burst servo information pattern eliminates error due to misalignment of transition bursts across a track width and contributes to more accurate read/write head positioning.

The present invention has been described above in terms of presently preferred embodiments so that an understanding of the present invention can be conveyed. There are, however, many configurations for disk drive servo control systems not specifically described herein, but with which the present invention is applicable. The present invention should therefore not be seen as limited to the particular embodiments described herein, but rather, it should be understood that the present invention has wide applicability with respect to disk drive servo control systems generally. All modification, variations, or equivalent arrangements that are within the scope of the attached claims therefore should be considered within the scope of the invention.

We claim:

1. A disk drive servo control system for a high density disk drive having a magnetic head that is mounted on a disk arm and moved across the surface of a rotating disk storage medium by a servo mechanism for reading servo control information recorded in tracks on the disk storage medium surface and generating a servo information signal, the servo con trol system comprising:

an analog-to-digital converter that asynchronously receives the servo information signal om the magnetic head and converts it to a digital representation;

a demodulator that receives the converted servo information signal from the analog-to-digital converter and squares the digitized servo information signal to produce a digital quadrature position error signal (PES) that indicates the position error of the magnetic head relative to the centerline of the track; and a servo controller that receives the position error signal and generates a control signal that is provided to the magnetic head servo to maintain the magnetic head in proper position relative to the track.

2. A servo control system as defined in claim 1, further comprising:

a preamplifier that receives the servo information signal from the read/write head; and an automatic gain control that controls the amplitude of the servo information signal from the preamplifier within predetermined limits and provides the limited signal to the analog-to-digital converter.

3. A servo control system as defined in claim 1, wherein the demodulator includes a digital filter that receives the digitized servo information, filters it, and provides a filtered signal to the squarer.

4. A servo control system as defined in claim 3, wherein the filter is a harmonic notch filter with odd symmetry filter coefficients.

5. A servo control system as defined in claim 4, wherein the demodulator digital filter is a Hilbert Transform filter.

6. A servo control system as defined in claim 1, wherein the squarer comprises a logic circuit.

7. A servo control system as defined in claim 1, wherein the squarer comprises a quadrature sum-and-squarer that sums the squares of odd and even digitized samples.

8. A servo control system as defined in claim 1, wherein the demodulator burst accumulator receives the squared signal, adds all squared terms, and converts the sum of servo signal peak amplitude for each servo burst timing interval to accumulated data terms.

9. A servo control system as defined in claim 8, wherein the accumulated data terms comprise a series of terms $z_1$, $z_2$, . . . , $z_n$; the servo burst timing interval comprises four radially succeeding intervals P1, P2, P3, and P4; and the accumulated quadrature burst pattern data comprises terms PESA, PESB, PESC, and PESD such that PESA=$\Sigma z_n$ for burst intervals P1 and P2, PESB=$\Sigma z_n$ for burst intervals P3 and P4, PESC=$\Sigma z_n$ for burst intervals P2 and P3, and PESD=$\Sigma z_n$ for burst intervals P1 and P4.

10. A servo control system as defined in claim 9, wherein the PES burst accumulator comprises a running sum logic circuit.

11. A servo control system as defined in claim 9, wherein the demodulator demodulates the accumulated quadrature burst pattern data and produces a primary position error signal PESP and a quadrature position error signal PESQ that are ninety degrees out of phase as the head is moved across the tracks, are defined by PESP=PESD−PESC and

PESQ=PESB−PESA, and are indicative of read/write head position error relative to the center of a data track.

12. A high density disk drive comprising:

a disk storage medium having a recording surface;

a magnetic head mounted on a disk arm above the recording surface;

a servo mechanism for moving the magnetic head over the recording surface of the disk storage medium and reading servo control information recorded in tracks on the disk storage medium surface and generating a servo information signal;

an analog-to-digital converter that asynchronously samples the servo information signal from the magnetic head and converts it to a digital representation;

a demodulator that receives the converted servo information signal from the analog-to-digital converter and squares the digitized servo information signal to produce a digital quadrature position error signal (PES) that indicates the position error of the magnetic head relative to the centerline of the track; and a servo controller that receives the position error signal and generates a control signal that is provided to the magnetic head servo to maintain the magnetic head in proper position relative to the track.

13. A servo control system as defined in claim 12, further comprising:

a preamplifier that receives the servo information signal from the read/write head; and an automatic gain control that controls the amplitude of the servo information signal from the preamplifier within predetermined limits and provides the limited signal to the analog-to-digital converter.

14. A servo control system as defined in claim 12, wherein the demodulator includes a digital filter that receives the digitized servo information, filters it, and provides a filtered signal to the squarer.

15. A servo control system as defined in claim 14, wherein the filter is a harmonic notch filter with odd symmetry filter coefficients.

16. A servo control system as defined in claim 15, wherein the demodulator digital filter is a Hilbert Transform filter.

17. A servo control system as defined in claim 12, wherein the squarer comprises a logic circuit.

18. A servo control system as defined in claim 12, wherein the squarer comprises a quadrature sum-and-squarer that sums the squares of odd and even digitized samples.

19. A servo control system as defined in claim 12, wherein the demodulator burst accumulator receives the squared signal, adds all squared terms, and converts the sum of servo signal peak amplitude for each servo burst timing interval to accumulated data terms.

20. A servo control system as defined in claim 19, wherein the accumulated data terms comprise a series of terms $z_1, z_2, \ldots, z_n$; the servo burst timing interval comprises four radially succeeding intervals P1, P2, P3, and P4; and the accumulated quadrature burst pattern data comprises terms PESA, PESB, PESC, and PESD such that PESA=$\Sigma z_n$ for burst intervals P1 and P2, PESB=$\Sigma z_n$ for burst intervals P3 and P4, PESC=$\Sigma z_n$ for burst intervals P2 and P3, and PESD=$\Sigma z_n$ for burst intervals P1 and P4.

21. A servo control system as defined in claim 20, wherein the PES burst accumulator comprises a runling sum logic circuit.

22. A servo control system as defined in claim 20, wherein the demodulator demodulates the accumulated quadrature burst pattern data and produces a primary position error signal PESP and a quadrature position error signal PESQ that are ninety degrees out of phase, are defined by PESP=PESD−PESC and

PESQ=PESB−PESA, and are indicative of read/write head position error relative to the center of a data track.

23. A position error signal demodulator system comprising:

a read/write head that reads servo information comprising quadrature burst pattern data recorded in tracks on a storage medium and produces a servo information signal;

an automatic gain control that automatically controls the gain of the servo information signal and produces a range-limited servo information signal;

a signal converter that converts the range-limited servo information signal to a digital servo signal;

a squarer circuit that receives the digital servo signal and produces a squared servo information signal;

a burst accumulator circuit that accumulates the squared servo information signal data for each quadrature burst pattern;

a quadrature demodulator that demodulates the quadrature burst pattern data from the burst accumulator means and produces a primary position error signal and a quadrature position error signal that are indicative of read/write head position error relative to the center of a data track; and a linear ramping circuit that receives the primary position error signal and quadrature position error signal and combines the two signals so as produce a substantially linear PES ramp signal for the track that can be used by a servo controller to control position of the read/write head over the track.

24. A position error signal demodulator as defined in claim 23, wherein the signal converter comprises an analog-to-digital converter that asynchronously converts the servo information signal to a digital representation in accordance with a system clock signal.

25. A position error signal demodulator as defined in claim 23, wherein the read/write head reads the servo information from the storage medium in accordance with sector servo pattern time intervals.

26. A position error signal demodulator as defined in claim 23, wherein the squarer circuit includes a filter circuit that digitally filters the converted servo information signal through a notched filter and produces a digital quadrature position error signal PES that indicates the position error of the read/write head relative to the centerline of the track.

27. A position error signal demodulator as defined in claim 23, wherein the burst accumulator circuit comprises a PES burst accumulator that receives the squared servo information signal, adds all squared terms of the signal, and converts the sum of servo signal squared terms for each servo burst timing interval to produce an accumulated PES data signal for each servo burst timing interval, the PES data signal comprising a series of terms $z_1, z_2, \ldots, z_n$.

28. A position error signal demodulator as defined in claim 27, wherein the quadrature burst pattern data is recorded in intervals of four repeating, radially successive groups P1, P2, P3, and P4 and wherein the burst accumulator circuit produces four accumulated PES data signals PESA, PESB, PESC, and PESD that are defined by PESA=$\Sigma z_n$ for burst groups P1 and P2, PESB=$\Sigma z_n$ for burst groups P3 and P4, PESC=$\Sigma z_n$ for burst groups P2 and P3, and PESD=$\Sigma z_n$ for burst groups P1 and P4.

29. A position error signal demodulator as defined in claim 28, wherein the quadrature demodulator demodulates the quadrature burst pattern data from the burst accumulator circuit and produces a primary position error signal PESP and a quadrature position error signal PESQ that are ninety degrees out of phase and are defined by PESP=PESD−PESC and

PESQ=PESB−PESA, and are indicative of read/write head position error relative to the center of a data track.

30. A position error signal demodulator system as defined in claim 23, wherein the squarer circuit includes a quadrature sum and squarer that receives data samples of the digital servo signal, adds alternating odd and even terms of the samples together, squares the terms, and sums the terms for a predetermined burst interval, thereby producing the squared servo information signal.

31. A method of detecting servo information and demodulating a position error signal from the servo information, the method comprising the steps of:

reading the servo information comprising quadrature burst pattern data recorded in tracks on a storage medium for producing a servo information signal;

automatically controlling the gain of the servo information signal and producing a range-limited servo information signal;

converting the range-limited servo information signal to a digital servo signal;

squaring the digital servo signal and producing a squared servo information signal;

accumulating the squared servo information signal data for each quadrature burst pattern;

demodulating the quadrature burst pattern data and producing a primary and quadrature position error signal that are indicative of read/write head position error relative to the center of a data track; and combining the primary position error signal and the quadrature position error signal to produce a substantially linear PES ramp signal for the track that can be used by a servo controller to control position of the read/write head over the track.

32. A method as defined in claim 31, wherein the step of accumulating includes the steps of adding all squared terms of the signal and converting the sum of servo signal squared terms for each servo burst timing interval to produce an accumulated PES data signal for each servo burst timing interval, the PES data signal comprising a series of terms $z_1, z_2, \ldots, z_n$.

33. A method as defined in claim 31, wherein the step of squaring the digital servo information signal includes the step of digitally filtering the converted servo information signal through a notched filter and producing a digital quadrature position error signal PES that indicates the position error of the read/write head relative to the centerline of the track.

34. A method as defined in claim 33, wherein the quadrature burst pattern data is recorded in intervals of four repeating and radially succeeding patterns P1, P2, P3, and P4 and converting the sum of squared terms produces four accumulated PES data signals PESA, PESB, PESC, and PESD that are defined by $PESA = \Sigma z_n$ for burst intervals P1 and P2, $PESB = \Sigma z_n$ for burst intervals P3 and P4, $PESC = \Sigma z_n$ for burst intervals P2 and P3, and $PESD = \Sigma z_n$ for burst intervals P1 and P4.

35. A method as defined in claim 34, wherein the step of demodulating the quadrature burst pattern data comprises producing a primary position error signal PESP and a quadrature position error signal PESQ that are ninety degrees out of phase as the head is moved across the tracks and are defined by PESP = PESD − PESC and

PESQ = PESB − PESA, and are indicative of read/write head position error relative to the center of a data track.

36. A method as defined in claim 31, wherein the step of squaring the digital servo information signal includes the steps of summing alternating odd and even terms of the samples, squaring the summed terms, and summing the squared terms for a predetermined burst interval.

\* \* \* \* \*

UNITED STATES PATENT AND TRADEMARK OFFICE
CERTIFICATE OF CORRECTION

PATENT NO. : 5,774,298
DATED : June 30, 1998
INVENTOR(S) : Cheung et al

It is certified that error appears in the above-identified patent and that said Letters Patent is hereby corrected as shown below:

Column 14, line 64
Column 15, line 5
Column 15, line 9
Column 15, line 12
Column 15, line 14
Column 15, line 16
Column 15, line 19
Column 15, line 24
Column 15, line 34
Column 15, line 37 change " servo control system" to --A high density disk drive--

Signed and Sealed this

Twentieth Day of July, 1999

Attest:

Q. TODD DICKINSON

*Attesting Officer*   Acting Commissioner of Patents and Trademarks